United States Patent Office 3,389,103
Patented June 18, 1968

3,389,103
THERMOSETTING BLEND OF ALKYLOLATED AM-
IDE-CONTAINING INTERPOLYMER AND HY-
DROXY - FUNCTIONAL INTERPOLYMER CON-
TAINING MALEIC ANHYDRIDE GROUPS PAR-
TIALLY ESTERIFIED WITH ALCOHOL AND RE-
ACTED WITH MONOEPOXIDE
Kazys Sekmakas, Chicago, Ill., assignor to De Soto, Inc.,
a corporation of Delaware
No Drawing. Filed Mar. 10, 1965, Ser. No. 438,738
6 Claims. (Cl. 260—21)

ABSTRACT OF THE DISCLOSURE

Thermosetting organic solvent solution coating compositions are provided by blending in the organic solvent medium an alkylolated amide interpolymer with a solvent-soluble hydroxy copolymer produced by copolymerizing maleic anhydride with other vinyl monomers and then partially esterifying the anhydride groups with an alcohol to generate secondary carboxyl groups which are then reacted with monoepoxide, such as propylene oxide, to generate an hydroxy ester. In this way, compatible and reactive systems are provided at minimum cost.

---

The present invention is directed to economical organic solvent solution coating compositions containing a heat-hardening blend of copolymers or interpolymers including alkylolated carboxylic acid amides, such as acrylamide, and copolymers or interpolymers including an hydroxy-functional derivative of a dicarboxylic monoethylenically unsaturated acid or anhydride.

Valuable properties can be obtained by blending interpolymers containing alkylolated carboxylic acid amides with hydroxyl-functional resins, but such blending introduces problems. Thus, the art teaches the use of alkyd resins, but these lack compatibility. Hydroxyl-functional acrylic polymers have better compatibility, such as copolymers of styrene and allyl alcohol, but these are costly.

The invention permits the provision of economical blends of improved properties.

The first component of blends in accordance with the invention are interpolymers of carboxylic acid amide, preferably an acrylamide, with other ethylenically unsaturated material copolymerizable therewith, the interpolymer including amido hydrogen atoms at least partially replaced by reaction with an aldehyde to provide alkylol groups which may be etherified with an alcohol, though minimum etherification is preferred.

As a result, the interpolymer desirably includes amido hydrogen atoms replaced by the structure:

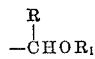

wherein R is selected from the group consisting of hydrogen, furyl, and aromatic and saturated lower aliphatic hydrocarbon radicals containing up to 10 carbon atoms, and $R_1$ is selected from the group consisting of hydrogen, and the etherification residue of aliphatic alcohol containing up to 10 carbon atoms. Preferably, R is hydrogen.

As will be more fully appreciated hereinafter, considerable variation is permissible in the kind and ratio of the aldehyde modifying agent and the etherifying agent, if used.

While it is preferred to employ acrylamide in proportions of from 2 to 50%, preferably from 2 to 30% by weight, the invention is not limited to acrylamide or to the presence of a terminal methylene group. Thus, other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

Preferred interpolymers include significant proportions of monomers containing the

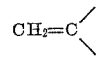

group, especially combinations of monomers forming hard polymers, such as styrene, vinyl toluene and methyl methacrylate, with monomers forming soft polymers, such as monoethylenically unsaturated carboxylic acid esters having a terminal aliphatic hydrocarbon group containing from 2–20 carbon atoms, illustrated by ethyl acrylate, butyl acrylate, 2-ethylhexyl acrylate, and stearyl acrylate. Other diverse monomers such as vinyl chloride, vinyl stearate, n-butyl vinyl ether, lower olefins, acrylonitrile, etc., are also useful. Even materials devoid of the vinyl group such as maleic diesters, butene-2, conjugated fatty acids, etc., may be employed including unsaturated polyester resins, as disclosed in my prior application Ser. No. 115,330, now United States Patent No. 3,163,615.

Indeed, the presence of unsaturated polyester containing carboxyl and hydroxyl functionality is a feature of the invention since, in this way, the resins which are blended both contain hydroxyl groups not associated with a nitrogen atom in an environment of associated carboxyl groups providing a very complex cure which provides enhanced compatibility permitting high gloss, considerable flexibility in hard coatings, and excellent solvent resistance. The polyester is preferably used in an amount of from 3–30% of the amide interpolymer.

With respect to interpolymer production, it is possible, as disclosed in a prior application Ser. No. 100,804, filed jointly by myself, Robert E. Ansel and Karolis Drunga, now United States Patent No. 3,163,623, the disclosure of which is hereby incorporated by reference, to carry out the addition polymerization reaction at the same time that the aldehyde component is reacted with amido hydrogen atoms. In other words, polymerization and alkylolation may advantageously be accomplished at the same time and in a single stage. A basic catalyst may be used as taught in said prior application.

Any free-radical generating polymerization catalyst may be used for the solution copolymerization in accordance with the invention, the selection of catalyst being determined by the desired temperature of the polymerization reaction. The important point is that the agent liberate free radicals under the conditions of polymerization so that the addition polymerization is facilitated. The class of free radical generating polymerization catalysts is too well known to require elucidation except to point out that typical catalysts are illustrated in the examples.

The aldehyde modifying agent is desirably used in an amount of from 0.2–5 equivalents of aldehyde, and preferably in an amount of from 1–4 equivalents of aldehyde for each amide group used in the formation of the acrylamide interpolymer. The preferred aldehyde is formaldehyde. Other monoaldehydes, including acetaldehyde, propionaldehyde, butyraldehyde, benzaldehyde, and furfural, or substances yielding an aldehyde, such as paraformaldehyde, hexamethylene tetramine or trioxymethylene can also be used.

Etherification of the aldehyde-modified amide interpolymer is not essential. Lower alcohols containing up to 10 carbon atoms, especially butanol and ethoxy and butoxy ethanol are preferred for etherification and the etherification reaction may be carried out up to 100% of the alkylol radical present in the interpolymer although little or no etherification is preferred. When less than 100% etherification is effected, as is preferred, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR₁, R representing a hydrocarbon radical introduced by the aldehyde modifying agent and $R_1$ is the residue of the alcohol produced by the etherification reaction. When the etherifying alcohol is a glycol, the group $R_1$ is hydroxy-terminated, but this is permissible in the invention in which the presence or absence of etherification is a mere matter of choice.

The particular nature of the organic solvent used for the solution copolymerization or for the solvent solution application of the interpolymers is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

The non-gelled, solvent-soluble hydroxy copolymers which are blended with the alkylolated amide-containing interpolymers in accordance with the invention and the production thereof is more fully described in my prior application Ser. No. 229,743 filed Oct. 10, 1962, now United States Patent 3,250,734, granted May 10, 1966, the disclosure of which is hereby incorporated by reference. In brief, a preformed anhydride-containing addition copolymer or interpolymer is reacted with a monohydric compound, such as an alcohol, to partially esterify the anhydride groups and thereby generate what can be termed secondary carboxyl groups. These secondary carboxyl groups are then reacted with an organic monoepoxide. From the standpoint of stoichiometry, the alcohol is reacted with the copolymer to an extent of from 50–150% of half esterification of the anhydride groups or the copolymer and the monoepoxide is reacted with at least 20% of the secondary carboxyl groups which have been made available. In preferred practice, a copolymer of maleic anhydride with a major proportion of other vinyl monomers is reacted with sufficient alcohol, such as butyl alcohol, to convert all of the anhydride groups to half-ester groups (100% of half esterification) and substantially all of the secondary carboxyl groups so-formed are then consumed by reaction with monoepoxide, such as propylene oxide.

While any ethylenically unsaturated polycarboxylic acid anhydride may be employed, maleic anhydride is particularly preferred, the term "a maleic anhydride" denoting the class of maleic anhydride and substitution products thereof. The preferred ethylenically unsaturated compounds which are copolymerized with maleic anhydride are styrene, vinyl toluene, and methyl methacrylate. It is also desirable to have from 20 to 45% by weight of the copolymer constituted by an alkyl acrylate other than methyl methacrylate.

The preferred monoexpoxides are ethylene oxide, propylene oxide, butylene oxide, styrene oxide and phenyl glycidyl ether. The maleic anhydride is preferably included in the copolymer in an amount of 5–30% by weight and the monohydric alcohol is preferably reacted with the copolymer to an extent of from 90–110% of half esterification of the anhydride groups of the copolymer, with the monoepoxide being later reacted with at least 90% of the secondary carboxyl groups made available by reaction with the monohydric alcohol.

The particular hydroxy interpolymers which are employed in the invention are not only very low in cost, thereby enabling economical admixtures, but they also provide unusually excellent compatibility and reactivity. In this regard, it is to be noted that the hydroxy interpolymers used in the invention always provide a reactive hydroxy group in the immediate vicinity of a plasticizing ester group which is not true in many other types of hydroxy interpolymers. It is possible that the superior properties which are obtained upon cure in accordance with the invention are a result of the fact that the acrylamide interpolymers of the invention condense with the reactive hydroxy groups of the hydroxy interpolymer to provide a point of union between the two different interpolymers with the point of union being directly adjacent the plasticizing ester group formed by the reaction of the plasticizing alcohol with the anhydride groups of the hydroxy interpolymer.

Broadly, the resin components which are combined in the invention are combinable over a broad range of proportions, e.g., from 5:95 to 95:5, by weight. It is preferred to employ proportions of alkylolated amide interpolymer to hydroxy interpolymer of from 80:20 to 40:60.

Both the resin components which are combined in the invention are highly soluble in common organic solvents such as aromatic hydrocarbons (toluene, xylene and commercial mixtures containing the same and homologs thereof) especially in admixture with alcohols, such as butanol, 2-ethoxy ethanol, 2-butoxy ethanol, and the like. Ketones such as acetone or methyl ethyl ketone, and esters, such as ethyl acetate will illustrate further typical organic solvents which may be used.

It will be understood that the invention is illustrated, but not limited by the specific examples presented hereinafter. It will also be evident that the products of the invention, while useful in diverse types of heat-hardening resinous compositions are primarily useful in the coating art, in which event they are applied either alone or in combination with the other resinous materials from a compatible organic solvent solution. These coating solutions may be pigmented or contain dyes, flow control agents, waxes and various other components as will be evident to those skilled in the art.

In the examples which follow, all parts are by weight, unless otherwise indicated.

EXAMPLE I

Preparation of hydroxy terpolymer of maleic anhydride vinyl toluene and alkyl acrylate

| Terpolymer composition: | Percent |
|---|---|
| Vinyl toluene | 48 |
| Maleic anhydride | 16 |
| Ethyl acrylate | 36 |

| Charge composition: | Grams |
|---|---|
| Aromatic hydrocarbon solvent, boiling range of 145–195° C. | 400 |
| Vinyl toluene | 480 |
| Ethyl acrylate | 360 |
| Maleic anhydride | 160 |
| Benzoyl peroxide | 5 |
| Di-tert-butyl peroxide | 5 |
| n-Butyl alcohol | 330 |
| Propylene oxide | 120 |
| Benzyl trimethyl ammonium chloride | 6 |
| Xylol | 580 |

Procedure of polymerization.—The vinyl toluene-maleic anhydride-ethyl acrylate terpolymer is prepared by charging into a reactor equipped with an agitator, thermometer, nitrogen inlet tube and reflux condenser, 400 grams of aromatic hydrocarbon solvent having a boiling range of 145–195° C. The contents of the flask are heated to 280–290° F. and 160 grams of maleic anhydride are dissolved in 480 grams of vinyl toluene and 360 grams of ethyl acrylate. To this mixture, as catalysts, are added 5 grams of di-tert-butyl peroxide and 5 grams of benzoyl peroxide. This monomer-catalyst solution is then added dropwise through a dropping funnel to the hot solvent over a period of three hours while maintaining a light reflux.

After the monomer-catalyst addition is completed the flask contents are held for an additional three hours at 285–295° F. The product is then cooled to 230° F. and 330 grams of n-butyl alcohol and 6 grams of benzyl trimethyl ammonium chloride are added.

The contents of the reactor are reheated to 230° F. and 100 grams of propylene oxide are added over a 90-minute period from a separatory funnel.

After 3 hours refluxing the acid value of the interpolymer decreases from 51.0 to 16.0.

When an acid value of 15-17 is reached, the product is cooled to 200° F. and 15 grams of 100% phosphoric acid in butanol are added and filtered.

The following constants are obtained:

| | |
|---|---|
| Percent solids | 51.0 |
| Viscosity (Garner-Holdt) | U–V |
| Color (Gardner) | 1–2 |
| Acid number of solids | 16.2 |

When the hydroxyl-containing copolymers are combined with acrylamide polymers thermosetting film-forming products result which possess outstanding physical properties such as hardness, toughness, gloss, adhesion, flexibility and resistance to discoloration.

EXAMPLE II

This interpolymer was prepared using phenyl glycidyl ether instead of propylene oxide.

The same procedure for the preparation of interpolymer was used as described in Example I.

| Charge composition: | Grams |
|---|---|
| Aromatic hydrocarbon solvent, boiling range 145–195° C. | 400 |
| Vinyl toluene | 480 |
| Ethyl acrylate | 360 |
| Maleic anhydride | 160 |
| Di-tert-butyl peroxide | 5 |
| Benzoyl peroxide | 5 |
| Butyl alcohol | 330 |
| Phenyl glycidyl ether | 310 |
| Benzyl trimethyl ammonium chloride | 6 |
| Xylol | 580 |

The interpolymer has the following final characteristics:

| | |
|---|---|
| Percent solids | 49.7 |
| Viscosity | S–T |
| Color (Gardner) | 1–2 |
| Acid value of solids | 15.4 |

EXAMPLE III

Preparation of unsaturated polyester resin

Charge into a reactor equipped with an agitator, heating mantle, Dean-Stark trap, thermometer and nitrogen inlet tube 790 grams of dehydrated castor oil fatty acids, 250 grams of crotonic acid, 785 grams of glycerine and 400 grams of isophthalic acid. Add 50 grams of xylol as reflux solvent. Heat to 420° F. and hold for acid value of 5.0. Cool to 380° F. and add 240 grams of a technical grade of 1,1'-isopropylidenebis(p-phenyleneoxy) di-2-propanol, 160 grams of phthalic anhydride and 255 grams of azelaic acid. Heat to 420° F. and hold for an acid value of 13–15. Add 510 grams of butyl alcohol to provide a solution containing 80% solids.

The final characteristics of the polyester resin are:

| | |
|---|---|
| Solids (percent) | 79.5 |
| Viscosity (Gardner) | V–W |
| Color (Gardner) | 3–4 |

EXAMPLE IV

Preparation of acrylamide interpolymer

| Monomer composition: | Percent |
|---|---|
| Acrylamide | 13.9 |
| Styrene | 46.3 |
| Ethyl acrylate | 35.0 |
| Polyester resin of Example III | 5.0 |
| Glacial methacrylic acid | 0.7 |
| | 100.0 |

Charge composition:

| | |
|---|---|
| Xylol | 335 |
| Butanol | 175 |
| Paraformaldehyde | 100 |
| Acrylamide | 130 |
| Butanol | 400 |
| Xylol | 100 |
| Triethylamine | 3 |
| Styrene | 463 |
| Ethyl acrylate | 350 |
| Polyester resin of Example III (80% solids in butanol) | 65 |
| Glacial methacrylic acid | 7 |
| Azobisisobutyronitrile | 6 |
| Di-tertiary butyl peroxide | 6 |
| Tertiary dodecyl mercaptan | 19 |
| Cumene hydro peroxide | 12 |

Procedure of preparation.—Charge into a reactor equipped with an agitator, thermometer, condenser, nitrogen inlet tube and a Dean-Stark trap 335 parts of xylol, 175 parts of butanol and 100 parts of paraformaldehyde. In a separate container dissolve 130 parts of acrylamide, 400 parts of butanol and 100 parts of xylol. Add the balance of monomers and catalysts, except the cumene hydro peroxide. Add this monomer-catalyst blend to the reactor over 24 hours at 245–250° F. while collecting water in the Dean-Stark trap. Distill off 18 parts of water. Remove trap and replace with reflux condenser.

Add 3 parts of cumene hydro peroxide after 2, 4, 6 and 8 hours. Hold at reflux temperature for monomer conversion (50–51% solids).

The final characteristics of the interpolymer are:

| | |
|---|---|
| Solids (percent) | 51.3 |
| Viscosity | U–V |
| Color (Gardner) | 1 |

EXAMPLE V

Evaluation of hydroxy and acrylamide interpolymers in appliance enamel

The hydroxy and acrylamide interpolymers are formulated into a gloss enamel consisting of 28% titanium dioxide pigment and 32% non-volatile resin.

The non-volatile resin composition was:

| | Parts |
|---|---|
| Hydroxy interpolymer of Example I | 100 |
| Acrylamide resin of Example IV | 100 |

The enamel is ground in pebble mill to obtain a 7½ N.S. grind gauge reading. The enamel is drawn on steel panels and baked for 15 minutes in a gas-fired oven at 350° F. to cure the same.

The following results are obtained:

| | |
|---|---|
| Adhesion to metal | Excellent. |
| Pencil hardness | 2H–3H. |
| Forward impact (inch/lbs.) | 80. |
| Reverse impact (inch/lbs.) | 30. |
| Flexibility (conical mandrel) | Pass ⅛". |
| Gloss | 90. |
| Toluol resistance | Excellent. |
| Recoat adhesion | Excellent. |

EXAMPLE VI

Evaluation of hydroxy and acrylamide interpolymer in gloss coil coatings

The composition of the gloss enamel consists of 28% titanium dioxide pigment and 32% of non-volatile resin. The non-volatile resin composition was:

| | Parts |
|---|---|
| Hydroxy interpolymer of Example I | 30 |
| Acrylamide interpolymer of Example IV | 70 |

The films are applied using #38 wire wound rod on phosphate-treated aluminum and cured for 90 seconds at 475° F.

The coating has the following properties:

| | |
|---|---|
| Gloss | 91. |
| Pencil hardness | HB. |
| Reverse impact | Pass 40 inch/lbs. |
| 60 seconds toluol-resistance | Insoluble. |
| Adhesion to metal | Excellent. |
| 2T bend | Very good. |
| Chill bump (reverse impact at 40° F.) | Pass 30 inch/lbs. |

As the above results indicate, the coatings prepared utilizing blends of hydroxy and acrylamide interpolymers have excellent cure and gloss and result in coatings with very good flexibility, impact and adhesion properties.

Some comparative data will serve to show the importance of the invention.

EXAMPLE VII

Example V was repeated using 200 parts of the acrylamide resin of Example IV instead of a mixture of 100 parts of it with 100 parts of the hydroxy interpolymer of Example I to produce the following comparison:

| | 50% hydroxy interpolymer and 50% acrylamide resin of Example V | 100% acrylamide resin of Example IV |
|---|---|---|
| Adhesion to metal | Excellent | Excellent. |
| Pencil hardness | 2H-3H | 2H. |
| Forward impact (inch/lbs.) | 80 | 85. |
| Reverse impact (inch/lbs.) | 30 | 25. |
| Flexibility (conical mandrel) | Pass 1/8" | Pass 1/8". |
| Gloss (60°) | 90 | 91. |
| Toluol resistance | Excellent | Excellent. |
| Recoat adhesion | do | Do. |
| Discoloration after bake | None | None. |

As can be seen, the blend of Example V is fully comparable with the straight acrylamide interpolymer, but it is considerably less costly and aided the cure conferring added hardness with little sacrifice in flexibility.

EXAMPLE VIII

Again repeating Example V, but this time replacing the hydroxy interpolymer of Example I with a good grade appliance type castor alkyd provides the following comparative results:

| | 50% castor alkyd and 50% acrylamide resin of Example IV | 50% hydroxy interpolymer and 50% acrylamide resin of Example V |
|---|---|---|
| Adhesion to metal | Excellent | Excellent. |
| Pencil hardness | H-2H | 2H-3H. |
| Forward impact (inch/lbs.) | 100 | 80. |
| Reverse impact (inch/lbs.) | 35 | 30. |
| Flexibility (conical mandrel) | Pass 1/8" | Pass 1/8". |
| Gloss (60°) | 84 | 90. |
| Toluol resistance | Good | Excellent. |
| Recoat adhesion | Excellent | Do. |
| Discoloration after bake | Yellowing | None. |

As can be seen, the alkyd blend was softer, showed marked discoloration, was more solvent sensitive and exhibited somewhat reduced gloss.

The invention is defined in the claims which follow:

I claim:
1. In compatible admixture in organic solvent solution:
   (1) a solvent-soluble, heat-hardening, non-gelled interpolymer of interpolymerized components comprising:
      (a) from 2-50% by weight, based on the total weight of unsaturated polymerizable material, of an amide of a monoethylenically unsaturated carboxylic acid; and
      (b) the balance of the interpolymer being ethylenically unsaturated material copolymerizable with said amide, said interpolymer having amido hydrogen atoms replaced by the structure

in which R is selected from the group consisting of hydrogen, furyl, and aromatic and saturated lower aliphatic hydrocarbon radicals containing up to 10 carbon atoms, and $R_1$ is selected from the group consisting of hydrogen, alkyl and alkoxy alkyl radicals containing up to 10 carbon atoms in the radical; and (2) a solvent-soluble, non-gelled interpolymer constituted by an anhydride-containing addition interpolymer containing 2-50% by weight of a maleic anhydride and having its anhydride groups partially esterified with monohydric aliphatic organic compound containing a single hydroxyl group as the sole functional group thereof to an extent of from 50-150% of half esterification and having at least 20% of the secondary carboxyl groups formed by half esterification esterified with organic monoepoxide containing a single oxirane group as the sole functional group thereof, said monoepoxide forming an hydroxy ester; said component 1 and 2 being present in a weight ratio of from 95:5 to 5:95.

2. An organic solvent solution as recited in claim 1 in which said anhydride groups of said non-gelled interpolymer constituted by an anhydride-containing addition interpolymer are partially esterified with a monohydric alcohol selected from the group consisting of alkanols and ether alcohols containing at least two carbon atoms and containing a single hydroxyl group as the sole functional group thereof to an extent of from 90-110% of half esterification and at least 90% of the secondary carboxyl groups formed by half esterification are esterified with organic monoepoxide containing a single oxirane group as the sole functional group thereof.

3. An organic solvent solution as recited in claim 1 in which said amide is an acrylamide which is used in the proportions of 2-30% by weight.

4. An organic solvent solution as recited in claim 1 in which said components 1 and 2 are present in a weight ratio of from 80:20 to 40:60.

5. An organic solvent solution as recited in claim 1 in which said ethylenically unsaturated material of component 1 is constituted by from 3-30% by weight based on the total weight of unsaturated polymerizable material of polymerizable ethylenically unsaturated polyester, the balance being at least one other polymerizable monoethylenically unsaturated monomer copolymerizable with said unsaturated polyester and the amide in said component 1, said unsaturated polyester having a viscosity in n-butanol at 80% solids in the range of from C to Z–6 measured on the Gardner-Holdt scale at 25° C., containing about 0.005 to 0.40 gram mol of ethylenically unsaturated component per 100 grams of polyester, and the unsaturation of said unsaturated polyester being selected from the group consisting of (1) alpha, beta-unsaturation; (2) beta, gamma-unsaturation; and (3) conjugated unsaturation.

6. An article having a metal surface having as a coating thereon a hardened resinous composition of claim 1.

References Cited

UNITED STATES PATENTS

| | | | |
|---|---|---|---|
| 3,163,615 | 12/1964 | Sekmakas | 260—22 |
| 3,163,623 | 12/1964 | Sekmakas et al. | 260—22 |
| 3,230,275 | 1/1966 | Sekmakas | 260—860 |
| 3,250,734 | 9/1966 | Sekmakas | 260—230 |
| 3,257,475 | 6/1966 | Sekmakas | 260—850 |
| 3,278,638 | 10/1966 | Sekmakas | 260—22 |
| 3,315,011 | 4/1967 | Baugh | 260—836 |

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,389,103  June 18, 1968

Kazys Sekmakas

It is certified that error appears in the above identified patent and that said Letters Patent are hereby corrected as shown below:

Column 3, line 35, "or" should read -- of --; line 56, "monoexpoxides" should read -- monoepoxides --. Column 5, line 7, "100%" should read -- 10% --; line 11, "Garner" should read -- Gardner --. Column 8, line 23, "component" should read -- components --.

Signed and sealed this 23rd day of December 1969.

(SEAL)

Attest:

Edward M. Fletcher, Jr.

Attesting Officer

WILLIAM E. SCHUYLER, JR.

Commissioner of Patents